Hermann Vierl
INVENTOR

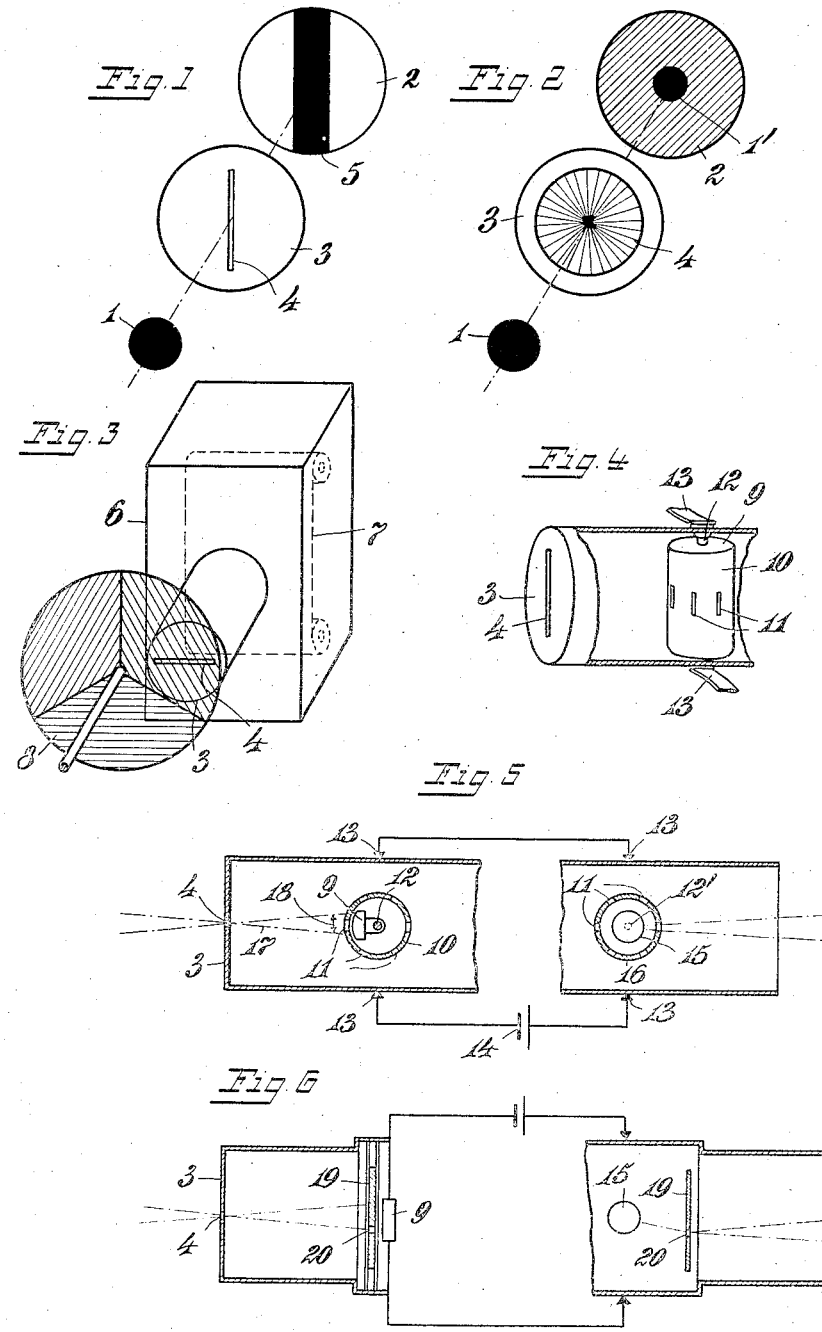

Patented Jan. 31, 1939

2,145,562

UNITED STATES PATENT OFFICE 2,145,562

SCANNING DEVICE

Hermann Vierl, Groebenzell, near Munich, Germany

Application March 29, 1935, Serial No. 13,678
In Germany March 27, 1934

2 Claims. (Cl. 178—7.6)

My invention relates to improvements in transmitting pictures and objects for reproduction at a distance.

The object of my invention is to improve the results obtained by decomposing the object into a plurality of radial lines, as distinguished from dots, and scanning the radial lines by a photoelectric cell substantially transversely to their longitudinal axes. The variations of light are transmitted in the usual manner by the television apparatus.

In carrying the invention into practice, when reproducing an object I interpose between the object and the image receiver a disc or diaphragm having a slit therein to produce upon the receiver a plurality of parallel lines of varying intensity of light. The intensity of light of every single line remains, however, the same throughout its whole length. When such a slit-image is scanned transversely to its axis, the intensity of light of every single parallel line of the slit-image is taken.

Figure 7:
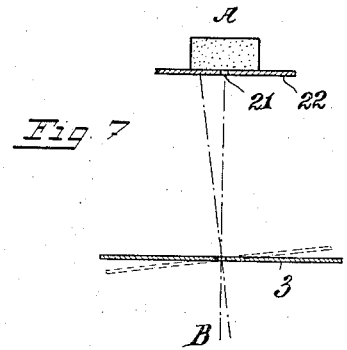
Figure 8:
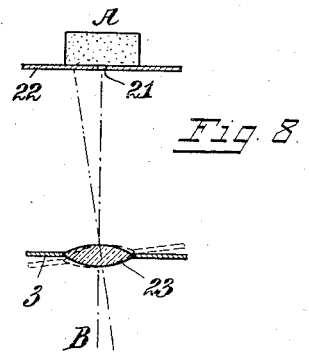
Figure 9:
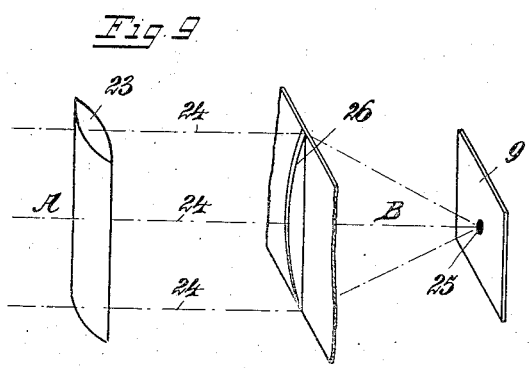

Several forms of the invention are illustrated in the accompanying drawings in which Fig. 1 is a device in oblique section during the position of rest of the slit-diaphragm;

Fig. 2 a device in oblique section during the rotation of the slit-diaphragm;

Fig. 3 a photographic apparatus for moving pictures in oblique section;

Fig. 4 a diaphragm equipped with a light-electric cell in oblique and cross section;

Fig. 5 the entire television equipment of Fig. 4;

Fig. 6 another form of a television equipment;

Fig. 7 a slit-diaphragm with light-electric cell in top-view;

Fig. 8 a cylinder-lens with light-electric cell schematically in top-view;

Fig. 9 a scanning device in oblique section; and

Figure 10:
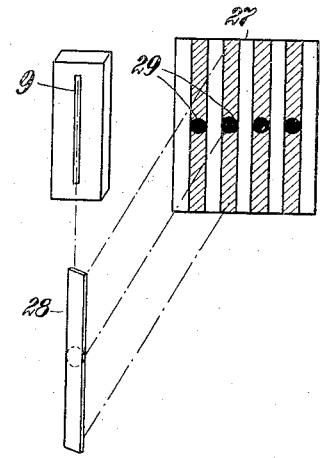

Fig. 10 another device likewise in oblique section.

According to Fig. 1 the object is represented by a point 1. Between screen 2 which may be formed by a photographic plate or a photographic film, and object 1 a diaphragm 3 provided with a slit 4 is rotatably arranged. For simplicity's sake the lenses are omitted from various views. Object 1 appears on screen 2 in the shape of an elongated dark stripe 5 caused by the slit 4 placed in front of it. When the slit-diaphragm 3 (Fig. 2) rotates, the points of intersection of the rotating dark stripes 5 will make the object 1' appear on screen 2.

The black point 1' on screen 2 is, of course, not present if this screen merely represents a ground glass disc. It is only visible to the eye as its seeing capacity is slower than the speed of the slit-diaphragm 3. If, however, the screen 2 is provided with a light-sensitive film, the object 1' will actually appear after development.

According to Fig. 3 a camera 6 with a moving film 7 for taking moving pictures carries the slit-diaphragm 3. The entire camera 6 together with the slit-diaphragm 3 revolves round the axis of rotation of the slit-diaphragm and is rotated, whilst film 7 is reeled off. Thus there appear on this film according to the position of slit 4 towards the filmband 7 horizontal and vertical lines similar to the sound film. Consequently the film may be transformed acoustically after development by means of a sound-film apparatus. But it is also possible without difficulty to use the film for showing the picture. A projection-apparatus is used for this purpose. Then the projection-apparatus and the film 7 must reel off in synchronism according to the exposure and must rotate at the same time and likewise in synchronism round the axis of rotation (of the slit-diaphragm 3).

In front of the slit-diaphragm 3 a transparent colour-disc 8 may be rotatably arranged, dyed in three different colours, blue, yellow, and red. The colour-disc 8 must rotate. By use of this colour-disc 8 and its rotation in synchronism with the diaphragm 3 when taking the picture and in synchronism with the projection apparatus when reproducing the film, the film is reproduced colored. The film-disc 8 has approximately double the radius of the slit-diaphragm. The axis of rotation of the colour-disc 8 lies outside the slit-diaphragm 3.

The pictures taken by means of the rotating disc are truer to nature than those taken in the known way, and especially they produce a better spatial effect. Distortions of the borders cannot take place in spite of simple lenses. The slit-diaphragm may, of course, be supplied with a linear lens to increase the intensity of light. Every image produced over slit 4 is composed of a plurality of lines running parallel. Each line has throughout its entire length the same intensity of light according to the kind of object taken.

So as to be able to use the slit-diaphragm also for television, the device represented by Figs. 4, 5 and 6 is employed. According to Figs. 4 and 5, a rotatable light-electric cell 9 is placed behind the slit-diaphragm 3, the cell 9 rotating with the slit-diaphragm about the axis of the latter. The light-electric cell is surrounded by a sleeve 10 having on its circumference at certain distances from slit 4 slits 11 being disposed parallel to the slit-diaphragm 3. Sleeve 10 and cell 9 revolve about a shaft 12 arranged perpendicularly to the axis of rotation of the slit-diaphragm 3. Any suitable means may be used for rotating the tube carrying the slit-diaphragm 3 and sleeve 10 about the axis of said tube and also for rotating sleeve 10 about the shaft 12. Spring contacts 13 serve to close the circuit, shown in Fig. 5, which connects the cell 9 with a source of current 14. This circuit, for the sake of simplicity, is illustrated in the drawings as a single simple circuit from which the usual amplifying devices are omitted. A lamp 15 located at the place of reception is influenced by the light-electric cell 9, the lamp 15 being arranged inside a sleeve 16 similar to sleeve 10 and likewise equipped with slits 11. The sleeve 16 rotates round a shaft 12' and also round a shaft arranged vertical to it similar to the photographic device according to Fig. 4.

The operation of the device is as follows:

Through slit 4—which naturally rotates—beams of light 17 are projected on sleeve 10. The rotating sleeve scans with its slits 11 the field of exposure transversely to the slit 4 of the diaphragm, whereby the light-electric cell is influenced alternately. The field of exposure projected through slit 4 of diaphragm 3 consists, as mentioned, of a plurality of lines having the same intensity of light throughout their entire length, but differing from one another in their intensity of light according to the character of the object. It is, therefore, sufficient to scan transversely part of the field of exposure projected on sleeve 10. The single lines differing from one another in their intensity of light produce over the light-electric cell fluctuations of current which are reproduced through the source of light 15 and the slits 11 of sleeve 16. The spacings of the slits 11 on sleeve 10 and 16 respectively correspond to the width 18 of the field projected on the sleeve.

The form shown in Fig. 6 demonstrates that it is possible to manage without turning the light-electric cell 9. For this purpose a screen 19 rotating with the slit-diaphragm 3 is arranged behind the latter, this screen having—in a similar manner to sleeve 10—a slit 20 arranged parallel to slit 4 of diaphragm 3. The screen 19 moves to and fro transversely to slit 4 of diaphragm 3, so that the screen-slit 20 scans alternately from one side to the other the field of exposure projected through slit 4 on the screen. Naturally the screen 19 rotates with the diaphragm 3. The variations of light are reproduced by a lamp 15 after having been fixed through the light-electric cell. The lamp may be arranged stationary. Behind the lamp there is, however, a screen 19 provided with slit 20 which moves to and fro and also rotates. Of course, synchronism is a fundamental condition with both the forms of Fig. 5 and Fig. 6.

Instead of the influence exercised by a source of light 15 such influence may, of course, also be exercised by a membrane or the like enlarging or reducing an opening according to the nature of influence. In this case the lamp used possesses a constant luminous power. But it is also possible to use the fluctuations of current caused by cell 9 to make a plate of wax or the like, and to use such wax-plate by itself at some other time for the reproduction of the image or of a sound.

Instead of the rotating slit 4 a lens having the same effect as the slit may be used, for instance a cylinder-lens.

According to Fig. 7 the slit-diaphragm 3 used is arranged to rotate about the longitudinal axis of the slit. In front of the light-electric cell 9 a diaphragm 22 provided with a slit 21 is arranged. The two diaphragms 3 and 22 rotate synchronously with the device of exposure as well as with the device of reception round the longitudinal axis A, B. Through the opening of the slit-diaphragm 3 a stripe-image is projected on the light-electric cell 9 the stripes of which show throughout their entire length the same intensity of light, but which differ from one another in the intensity of light. By the oscillation of the slit-diaphragm 3 the stripe-images are conducted past the slit 21 of the diaphragm 22 in such a manner that one stripe at a time reaches the light-electric cell 9. The stripe-image is scanned in this manner.

Fig. 8 shows a similar form of construction, but in which a cylindrical lens 23 takes the place of the slit-diaphragm 3 which lens is arranged to rotate about its optic longitudinal axis and to which an oscillating movement is imparted in the same manner as to the slit-diaphragm 3 (Fig. 7). The effect is the same in both cases.

The scanning is in this case facilitated by either the diaphragm 3 or the lens 23 as the case may be, performing rotary movements of very small angles only, which facilitates effecting the frequency required.

So as to intensify the light, the parallel image-stripes produced by the slit-diaphragm 3 or the cylinder-lens 23 may, of course, be contracted into image-points.

Fig. 9 shows such a form. Here again the cylinder-lens 23 is rotatably arranged. Behind the cylinder-lens there lies a lens 26 collecting the beams 24 of a stripe into a point 25, the lens 26 not participating in the rotating movements of the cylinder-lens 23.

Behind lens 26 there lies the light-electric cell 9 in the focus of the lens.

The two lenses 23 and 26 rotate about the common axis A, B. The cylinder-lens 23 at the same time performs the oscillating movements. The picture-stripes produced by the cylinder-lens 23 are conducted past lens 26 one after another and the beams of every light-stripe 24 conducted past at the time are collected into a picture-point 25 influencing the light-electric cell 9 which is stationary.

Fig. 10 shows an embodiment of the invention, in which the stripe-picture 27 is scanned by an oscillating mirror 28 reflecting onto the light-electric cell 9. If, in this case, the stripes of the stripe-picture 27 are contracted into picture-points 29, a mirror of smaller dimensions (shown in dotted lines) may be used.

The contraction of the picture-stripes into picture points is, of course, also possible, if neither the slit diaphragm nor the cylinder lens are made to oscillate, by using a slit diaphragm moving to and fro or a hollow cylinder drum provided with slits.

What I claim is:

1. Apparatus for visually reproducing objects, comprising a light sensitive cell, two slotted light shields between the object and the cell, the slots in the two shields being parallel to each other, means for moving one of said slots laterally with respect to the other, and means for simultaneously rotating the two slots about the line connecting the center of the object and the cell, so that light from every part of the object to be reproduced passes in predetermined sequence through both slots onto said cell.

2. Apparatus for visually reproducing objects, comprising a tube arranged with its axis directed towards the center of the object and having the end nearest the object substantially perpendicular to such axis and provided with a slot for the passage of light from said object, a light sensitive cell within said tube and a slotted shield for said cell, the slot therein being parallel to the slot in the end of the tube and located so as to pass a band of light passing through the first slot, means for moving one of said slots laterally with respect to the other slot, and means for simultaneously rotating said tube cell and shield as a unit about said axis, so that light from every part of the object to be reproduced passes in predetermined sequence through both slots onto said cell.

HERMANN VIERL.